(12) United States Patent
Rohde et al.

(10) Patent No.: US 10,683,787 B2
(45) Date of Patent: Jun. 16, 2020

(54) AUTOMOTIVE EXHAUST AFTERTREATMENT SYSTEM HAVING ONBOARD AMMONIA REACTOR WITH HYBRID HEATING

(71) Applicant: Faurecia Emissions Control Technologies, USA, LLC, Columbus, IN (US)

(72) Inventors: John Rohde, Columbus, IN (US); Edward Kinnaird, Columbus, IN (US); Madhuri Gandikota, Columbus, IN (US); Randy Cvelbar, Columbus, IN (US); Eric Ker, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 6 days.

(21) Appl. No.: 16/184,540

(22) Filed: Nov. 8, 2018

(65) Prior Publication Data
US 2020/0149450 A1 May 14, 2020

(51) Int. Cl.
*F01N 3/20* (2006.01)
*B01D 53/94* (2006.01)
(Continued)

(52) U.S. Cl.
CPC ......... *F01N 3/208* (2013.01); *B01D 53/9431* (2013.01); *B01D 53/9495* (2013.01); *F01N 3/2006* (2013.01); *F28D 21/0003* (2013.01); *H05B 3/02* (2013.01); *F01N 2610/02* (2013.01); *F01N 2610/10* (2013.01); *F01N 2900/1404* (2013.01); *F01N 2900/1411* (2013.01); *F01N 2900/1814* (2013.01)

(58) Field of Classification Search
CPC combination set(s) only.
See application file for complete search history.

(56) References Cited

U.S. PATENT DOCUMENTS

| 4,486,270 A | 12/1984 | Kaasenbrood |
|---|---|---|
| 5,240,688 A | 8/1993 | Von Harpe |

(Continued)

FOREIGN PATENT DOCUMENTS

| CH | 707551 | 8/2014 |
|---|---|---|
| CN | 104265422 | 1/2015 |

(Continued)

OTHER PUBLICATIONS

Zhanfeng Qi, Shusen Li, Xiuli Guo, "Development, Application and Direction of Development of Urea-SCR", International Journal of Multimedia and Ubiquitous Engineering, 2016, pp. 131-142, vol. 11, Issue No. 2016.

(Continued)

*Primary Examiner* — Binh Q Tran
(74) *Attorney, Agent, or Firm* — Barnes & Thornburg LLP

(57) ABSTRACT

An automotive exhaust aftertreatment system includes an onboard ammonium carbamate reactor. The onboard ammonium carbamate reactor is coupled to a diesel emission fluid reservoir also included in the system and is configured to generate aqueous ammonium carbamate solution from diesel emission fluid. A hybrid heating system for use with the ammonium carbamate reactor is provided in this disclosure.

14 Claims, 5 Drawing Sheets

(51) Int. Cl.
*F28D 21/00* (2006.01)
*H05B 3/02* (2006.01)

(56) References Cited

U.S. PATENT DOCUMENTS

| | | | |
|---|---|---|---|
| 5,827,490 | A | 10/1998 | Jones |
| 6,077,491 | A | 6/2000 | Cooper |
| 7,449,162 | B2 | 11/2008 | Schaller |
| 7,595,034 | B2 | 9/2009 | Nissinen |
| 8,418,443 | B2 * | 4/2013 | Millet ................... F01N 3/2066 60/286 |
| 8,518,354 | B2 | 8/2013 | Ayyappan |
| 8,893,484 | B2 * | 11/2014 | Park .......................... F01N 5/02 60/274 |
| 8,980,181 | B2 * | 3/2015 | Qi ........................... F01N 3/208 422/110 |
| 9,512,760 | B2 * | 12/2016 | Clayton, Jr. ............ F01N 3/208 |
| 9,598,977 | B2 | 3/2017 | Meyer |
| 9,687,782 | B1 * | 6/2017 | Miao .................. B01D 53/9431 |
| 9,732,650 | B2 * | 8/2017 | Tomita .................. F01N 3/2066 |
| 9,771,850 | B2 | 9/2017 | Henry |
| 2009/0031713 | A1 | 2/2009 | Suzuki |
| 2014/0363358 | A1 | 12/2014 | Udd |
| 2016/0061083 | A1 | 3/2016 | Pramas |
| 2017/0204762 | A1 | 7/2017 | Kotrba |

FOREIGN PATENT DOCUMENTS

| | | |
|---|---|---|
| DE | 102017101310 | 8/2017 |
| EP | 2543837 | 1/2013 |
| EP | 2870331 | 5/2015 |
| EP | 3330222 | 6/2018 |
| GB | 2552040 | 1/2018 |
| GB | 2562178 | 11/2018 |
| JP | 2015078643 | 4/2015 |
| KR | 20170013687 | 2/2017 |
| WO | 199956858 | 11/1999 |
| WO | 2006087553 | 8/2006 |
| WO | 2008077587 | 7/2008 |
| WO | 2013036308 | 3/2013 |
| WO | 2018075061 | 4/2018 |
| WO | 2018100187 | 6/2018 |

OTHER PUBLICATIONS

Tue Johannessen, "Compact ammonia storage systems for fuel-efficient NOX emissions reduction", CTI conference on SCR Systems, Jul. 5, 2010.

Anu Solla, Marten Westerholm, Christer Soderstrom, Kauko Tormonen, "Effect of Ammonium Formate and Mixtures of Urea and Ammonium Formate on Low Temperature Activity of SCR Systems", SAE International, 2005.

Daniel Peitz, "Investigations on the catalytic decomposition of guanidinium formate, ammonium formate and methanamide as NH3-precuresors for the selective catalytic reduction of NOX", Univeristy of Erlangen-Nuremberg, 2010.

Extended European Search Report for European Appl. No. 19207724.6, dated Feb. 26, 2020, 8 pages.

Extended European Search Report for European Appl. No. 19203355.3, dated Feb. 26, 2020, 9 pages.

* cited by examiner

AUTOMOTIVE EXHAUST AFTERTREATMENT SYSTEM HAVING ONBOARD AMMONIA REACTOR WITH HYBRID HEATING

BACKGROUND

The present disclosure relates to exhaust aftertreatment systems for automotive applications, and particularly to the incorporation of onboard ammonia creation and conversion reactors into such systems.

SUMMARY

An automotive exhaust aftertreatment system including an onboard ammonia reactor is described in this paper. The aftertreatment system is configured to mix both agent diesel emission fluid and aqueous ammonium carbamate solution provided by the ammonia reactor as reducing agents with exhaust gas moving through the system. The mixing of these reducing agents with exhaust gas is designed to cause a chemical reaction and reduce Nitrous Oxides (NOx) in the exhaust gas.

In illustrative embodiments, the system also includes a hybrid heating system that is used with the ammonia reactor. In particular, the hybrid heating system includes a passive heat exchanger driven by engine heat carried by the exhaust gas and an active heating element driven by electrical power. Notably, the disclosed passive heat exchanger draws heat from downstream of a catalyst included in the system so as not to reduce exhaust gas temperature before desired chemical reactions occur between the reducing agents and NOx in the exhaust gas. A controller selectively adjusts operation of the passive heat exchanger and the active heat exchanger to optimize operation of the hybrid heating system.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is perspective view of a diesel engine semi-truck with an automotive exhaust aftertreatment system including a catalytic NOx reduction unit, an onboard ammonia creation and conversion unit, and a hybrid heating system configured to manage temperatures within the automotive exhaust aftertreatment system;

FIG. 2 is a diagrammic view of the automotive exhaust aftertreatment system showing that the ammonia creation and conversion unit includes an ammonium carbamate reactor and an ammonium carbamate reservoir and showing that the hybrid heating system includes active and passive heating elements, a heating system controller configured to selectively modulate the heat from the hybrid heating system to control the temperature within the automotive exhaust aftertreatment system, and sensors configured to measure the temperature and tank levels within the exhaust aftertreatment system;

FIG. 3 is a detail diagrammatic view of the ammonium carbamate reactor of FIG. 2 showing an active reactor heating element and a passive reactor heat exchanger of the hybrid heating system are both coupled to the ammonium carbamate reactor and showing the passive reactor heat exchanger is configured to withdraw heat from exhaust gasses passing through the exhaust aftertreatment system downstream of the catalyst in the system;

DETAILED DESCRIPTION

Figure 1:
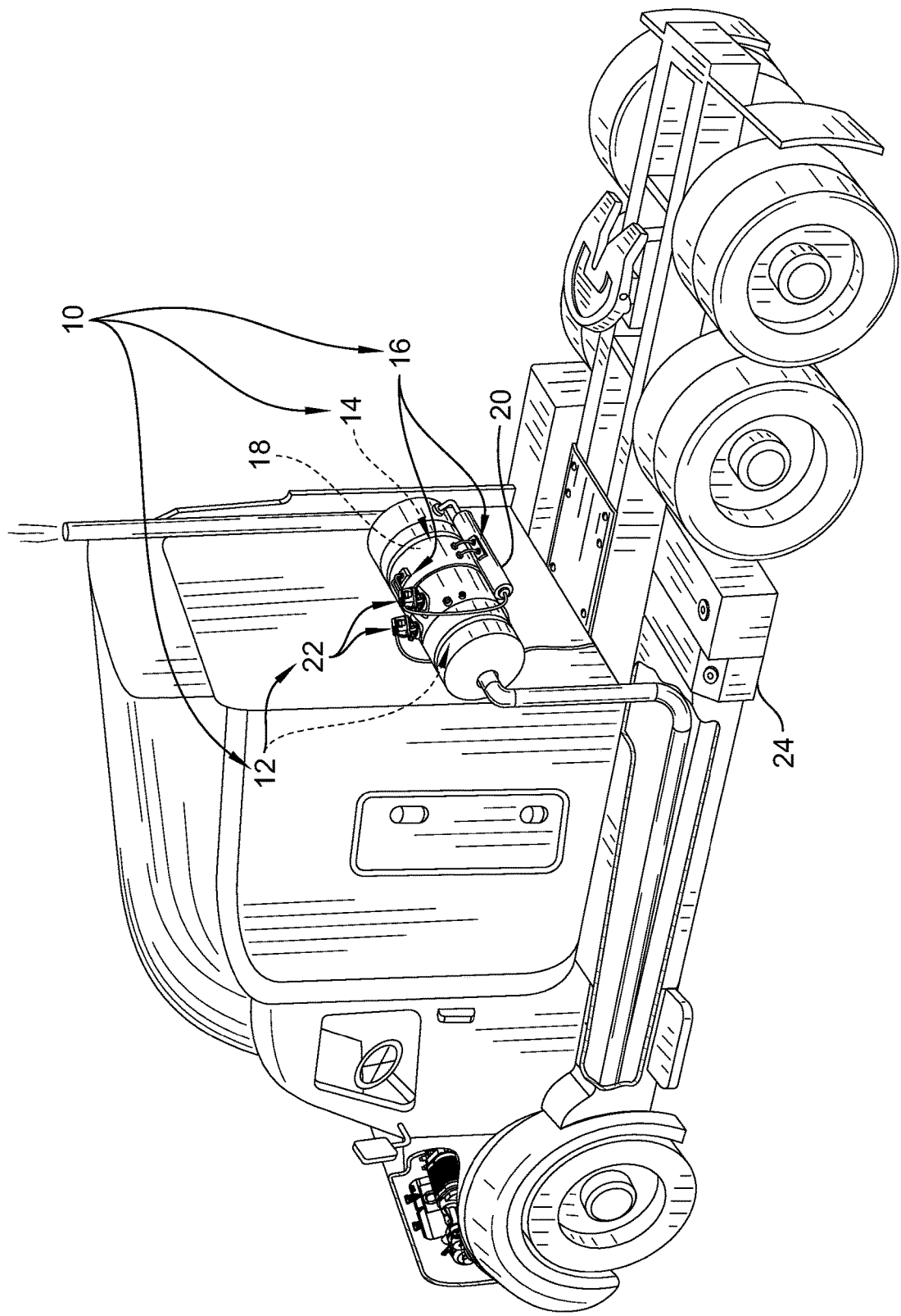

For the purposes of promoting an understanding of the principles of the disclosure, reference will now be made to a number of illustrative embodiments illustrated in the drawings and specific language will be used to describe the same.

An illustrative diesel engine semi-truck is shown in FIG. 1 having an automotive exhaust aftertreatment system 10 including catalytic nitrogen oxide reduction unit 12, an onboard ammonia creation and conversion unit 14, and a hybrid heating system 16. The catalytic NOx reduction unit 12 is configured to mix either diesel emission fluid or aqueous ammonium carbamate solution with an engine exhaust stream to convert nitrogen oxides (NOx) within the stream into nitrogen and water vapor or carbon dioxides which are then released into the surrounding air.

The ammonia creation and conversion unit 14 is configured to convert the diesel emission fluid into aqueous ammonium carbamate solution onboard the truck. The aqueous ammonium carbamate solution is configured to be injected in the exhaust flow before the catalytic NOx reduction unit 12 to reduce the nitrogen oxides at low temperatures such as during engine start up. The hybrid heating system 16 is configured to manage temperatures within the automotive exhaust aftertreatment system 10. Specifically, the hybrid heating system 16 is configured to manage temperatures within an ammonium carbamate reactor 18 and an ammonium carbamate reservoir 20 included in the ammonia creation and conversion unit 14. The hybrid heating system 16 may also manage temperatures within a dosing system 22 included in the catalytic NOx reduction unit 12.

The ammonia creation and conversion unit 14 includes an ammonium carbamate reactor 18 and an ammonium carbamate reservoir 20. The ammonium carbamate reactor 18 is coupled to a diesel emission fluid reservoir 24 included in the catalytic NOx reduction unit 12 and is configured to generate aqueous ammonium carbamate solution from diesel emission fluid. The ammonium carbamate reservoir 20 is coupled to the ammonium carbamate reactor 18 and is used for storing generated aqueous ammonium carbamate solution from the ammonium carbamate reactor 18.

The hybrid heating system 16 includes passive and active heating elements, a heating system controller 26, and a plurality of sensors 28 as shown in FIGS. 2-5. The heating system controller 26 is configured to selectively apply heat from the active heating elements to manage the temperature within the system 10. The heating system controller 26 is also configured to selectively modulate heat from the passive heating elements to control the temperature within the system 10. The heating system controller 26 is configured to selectively apply heat from the active heating elements and selectively modulate heat from passive heating elements based on information such as temperature and tank level measured by the plurality of sensors 28.

Figure 2:
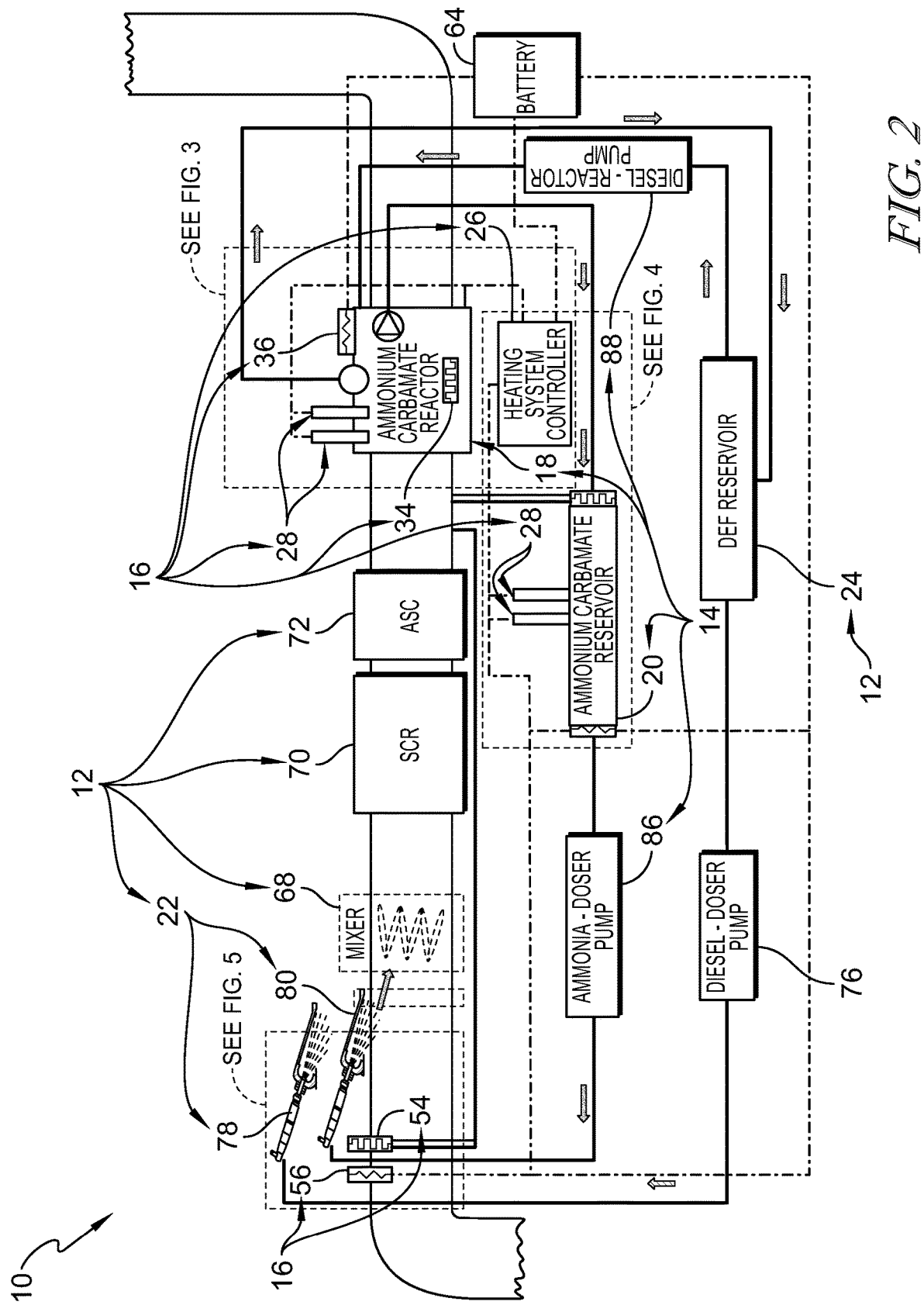
Figure 3:
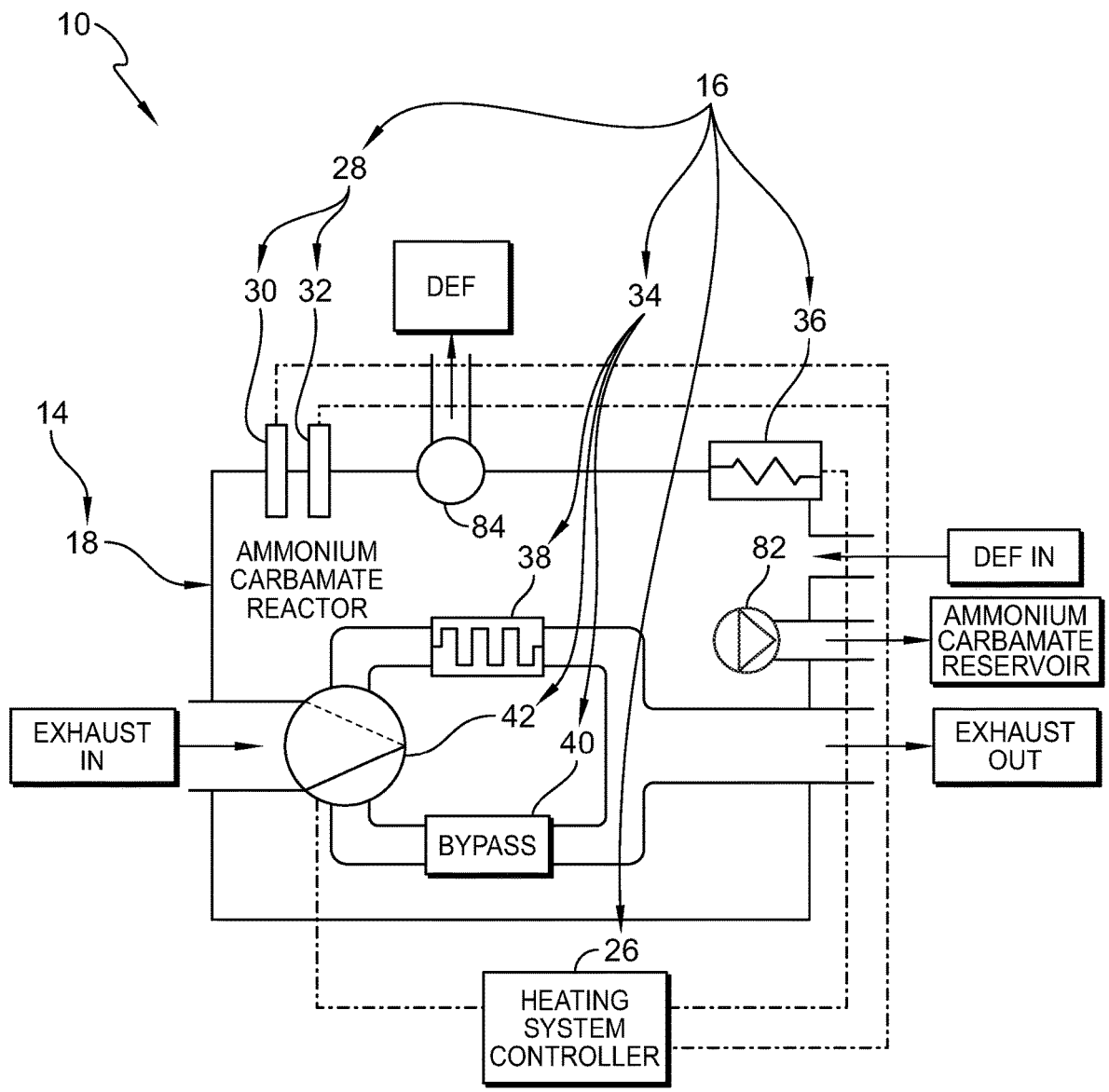

In the illustrative embodiment, the plurality of sensors 28 includes reactor temperature sensor 30, a reservoir temperature sensor 31, a reactor level sensor 32, and a reservoir level sensor 33 as shown in FIGS. 2 and 3. The reactor temperature sensor is coupled to the ammonium carbamate reactor 18 and is configured to measure the temperature of the contents in the ammonium carbamate reactor 18. The reactor level sensor 32 is coupled to the ammonium carbamate reactor 18 and configured to measure the amount of fluid in the reactor 18. Additionally, reservoir temperature sensor 31 and the reservoir level sensor 33 are coupled to the ammonium carbamate reservoir 20. The reservoir temperature sensor 31 measures the temperature of the contents stored in the reservoir 20. The reservoir level sensor 33 determines the levels of aqueous ammonium carbamate solution stored in the reservoir 20. The plurality of sensors 28 are in communication with the heating system controller 26.

The hybrid heating system 16 modulating the ammonium carbamate reactor 18 includes a passive reactor heat exchanger 34 and an active reactor heating element 36 as shown in FIG. 3. The passive reactor heat exchanger 34 is configured to withdraw heat from exhaust gasses passing through the exhaust aftertreatment system 10 and heat contents of the ammonium carbamate reactor 18. The active reactor heating element 36 is configured to produce heat from electrical energy supplied to the heating system 16 and heat contents of the ammonium carbamate reactor 18. The heating system controller 26 is electrically coupled to both active and passive heating elements 34, 36. The heating system controller 26 is also configured to selectively apply heat from the active reactor heating element 36 to manage the temperature within the ammonium carbamate reactor 18. The heating system controller 26 is also configured to selectively modulate heat from the passive reactor heat exchanger 34 to control the temperature within the ammonium carbamate reactor 18.

The passive reactor heat exchanger includes a passive reactor heat exchanger channel 38, a reactor bypass duct 40, and a passive reactor heat exchanger valve 42 as shown in FIG. 3. The passive reactor heat exchanger channel 38 is configured to withdraw the heat from the exhaust entering the passive reactor heat exchanger 34. The reactor bypass duct 40 is configured to allow exhaust entering the passive reactor heat exchanger 34 to bypass the passive reactor heat exchanger channel 38. The valve 42 is configured to extend between and interconnect the passive reactor heat exchanger channel 38 and the bypass duct 40 and modulate the exhaust flow entering the passive heat exchanger 34 between the passive reactor heat exchanger channel 38 and the bypass duct 40. The valve 42 modulates the exhaust flow entering the passive reactor heat exchanger 34 by changing between an open position in which the exhaust flow is directed toward the passive reactor heat exchanger channel 38 and a closed position in which the exhaust flow is directed toward the reactor bypass duct 40 and bypasses the channel 38. The valve 42 is configured to be in communication with the heating system controller 26 which changes the valve 42 between the open and closed positions.

Figure 4:
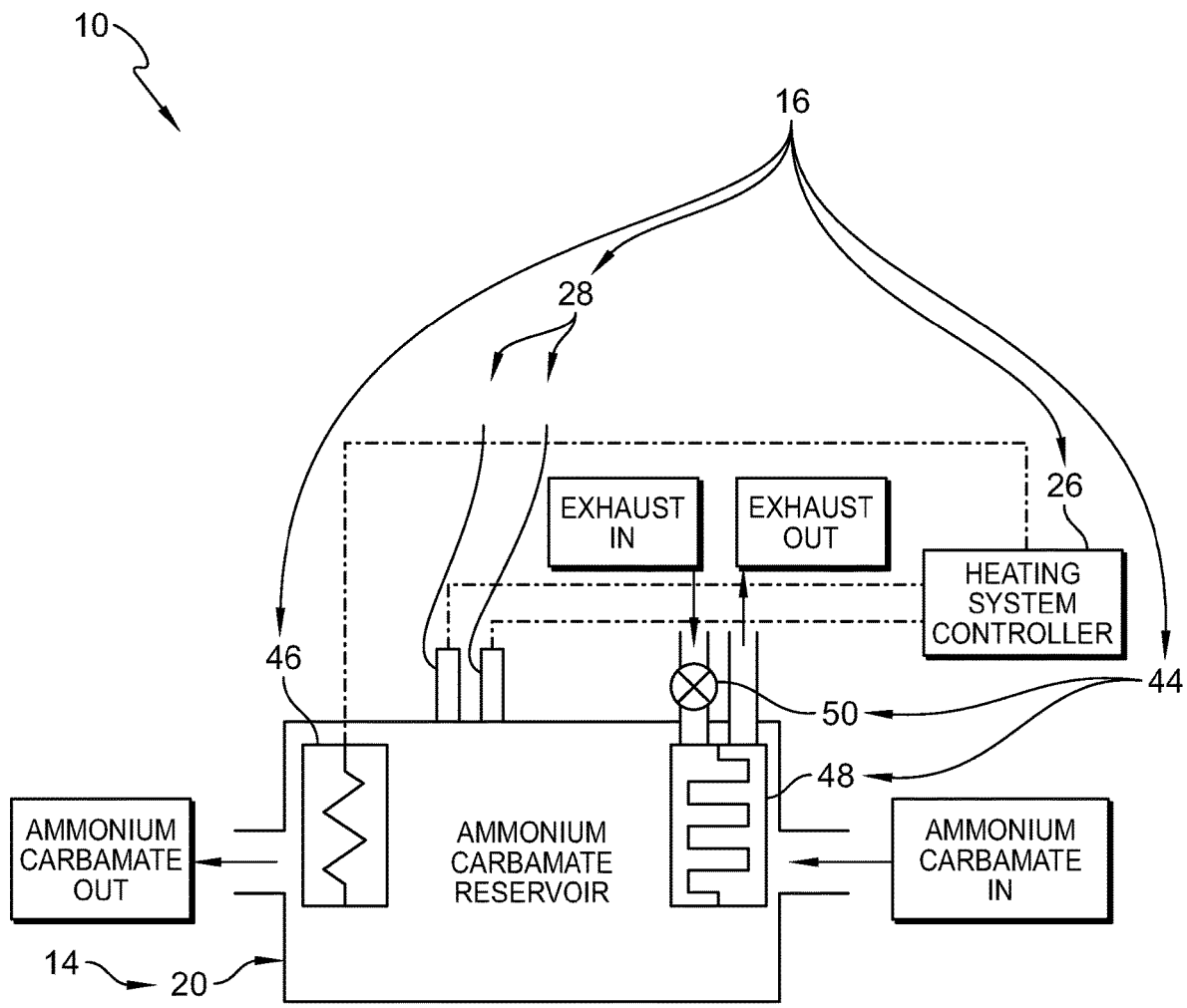
FIG. 4 is a detail diagrammatic view of the ammonium carbamate reservoir of FIG. 2 showing an active reservoir heating element and a passive reservoir heat exchanger of the hybrid heating system are both coupled to the ammonium carbamate reservoir and showing the passive reservoir heat exchanger is configured to withdraw heat from exhaust gasses passing through the exhaust aftertreatment system.

The hybrid heating system 16 also includes a passive reservoir heat exchanger 44 and an active reservoir heating element 46 as shown in FIG. 4. The passive reservoir heat exchanger 44 is configured to withdraw heat from exhaust gasses passing through the exhaust aftertreatment system 10 and heat contents of the ammonium carbamate reservoir 20.

The active reservoir heating element 46 is configured to produce heat from electrical energy supplied to the heating system 16 and heat contents of the ammonium carbamate reservoir 20. The heating system controller 26 is configured to selectively apply heat from the active reservoir heating element 46 to manage the temperature within the ammonium carbamate reservoir 20 to maintain equilibrium of stored aqueous ammonium carbamate solution. The heating system controller 26 is also configured to selectively modulate heat from the passive reservoir heat exchanger 44 to control the temperature within the ammonium carbamate reservoir 20 to maintain equilibrium of stored aqueous ammonium carbamate solution.

The passive reservoir heat exchanger 44 includes a passive reservoir heat exchanger channel 48 and a passive reservoir heat exchanger valve 50 as shown in FIG. 4. The passive reservoir heat exchanger channel 48 is configured to withdraw the heat from the exhaust entering the passive reservoir heat exchanger 44. The valve 50 is arranged at an inlet to the passive reservoir heat exchanger channel 48 and is configured to modulate the exhaust flow entering the passive reservoir heat exchanger 44 by changing between an open position in which the exhaust flow is permitted to enter the passive reservoir heat exchanger channel 48 and a closed position in which the exhaust flow is prevented from entering the passive reservoir heat exchanger channel 48. The valve 50 is configured to be in communication with the heating system controller 26 which changes the valve 50 between the open and closed positions.

Figure 5:
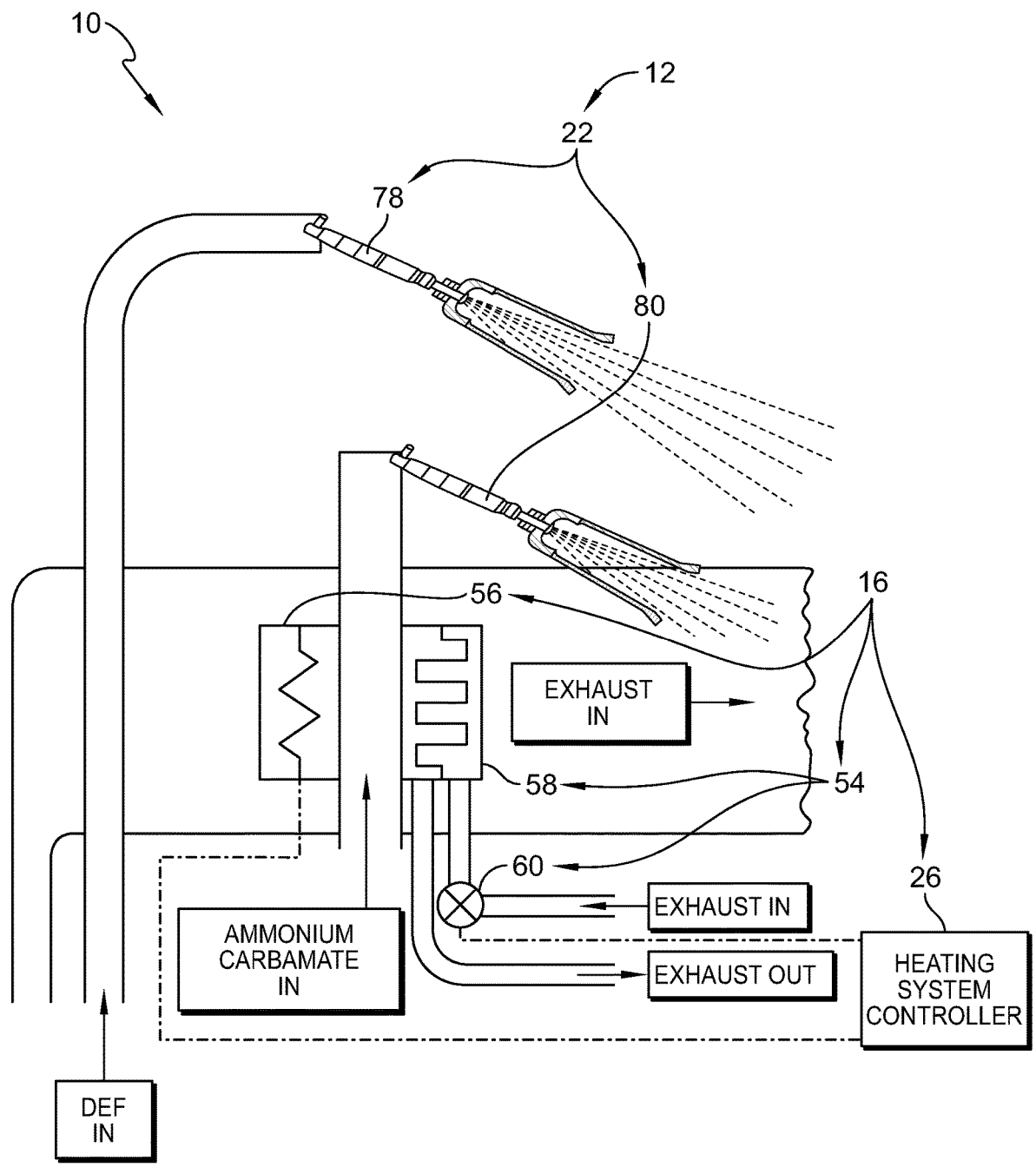
FIG. 5 is a detail diagrammatic view of a dosing system included in the automotive exhaust aftertreatment system of FIG. 2 showing that active and passive heating elements are coupled to the dosers.

The hybrid heating system 16 may also include a passive doser heat exchanger 54 and an active doser heating element 56 as shown in FIG. 5. The passive doser heat exchanger 54 is configured to withdraw heat from exhaust gasses passing through the exhaust aftertreatment system 10 and heat passageways through the dosing system 22. The active doser heating element 56 is configured to produce heat from electrical energy supplied to the heating system 16 and heat passageways through the dosing system 22. The heating system controller 26 is configured to selectively apply heat from the active doser heating element 56 as to manage the temperature of aqueous ammonium carbamate solution moving in passageways through the dosing system 22. The heating system controller 26 is also configured to selectively modulate heat from the passive doser heat exchanger 54 as to manage the temperature of aqueous ammonium carbamate solution moving in passageways through the dosing system 22. Additionally, the heating system controller 26 is configured to selectively apply heat from the active doser heating element 56 and to selectively modulate heat from the passive doser heat exchanger 54 so as to manage the temperature of aqueous ammonium carbamate solution discharged from the doser at or above 60 degrees Celsius. In one embodiment, the heating system controller 26 is configured to selectively apply heat from the active doser heating element 56 and to selectively modulate heat from the passive doser heat exchanger 54 so as to manage the temperature of aqueous ammonium carbamate solution discharged from the doser between about 60 degrees Celsius and about 200 degrees Celsius.

The passive doser heat exchanger 54 includes a passive doser heat exchanger channel 58 and a passive doser heat exchanger valve 60 as shown in FIG. 5. The passive doser heat exchanger channel 58 is configured to withdraw the heat from the exhaust entering the passive doser heat exchanger 54. The valve 60 is arranged at an inlet to the passive doser heat exchanger channel 58 and is configured to modulate the exhaust flow entering the passive doser heat exchanger 54 by changing between an open position in which the exhaust flow is permitted to enter the passive doser heat exchanger channel 58 and a closed position in which the exhaust flow is prevented from entering the passive doser heat exchanger channel 58. The valve 60 is configured to be in communication with the heating system controller 26 which changes the valve 60 between the open and closed positions.

The heating system controller 26 is configured to selectively apply heat from the active heating elements 36, 46, 56 and selectively modulate the heat from the passive heat exchangers 34, 44, 54 based on several factors. For example, the heating system controller 26 selectively applies heat from the active reactor heating element 36 based on information associated with tank level within the ammonium carbamate reservoir 20 received from sensors 28 in communication with the heating system controller 26. The heating system controller 26 applies heat from the active reactor heating element 36 when the contents of the ammonium carbamate reservoir 20 is running low and the passive reactor heat exchanger 34 is not generating enough heat to produce more aqueous ammonium carbamate solution.

The heating system controller 26 may also selectively apply heat from the active reactor heating element 36 based on information associated with the temperature within the reactor 18. The heating system controller 26 applies heat from the heating element 36 when the passive heating element 34 does not supply enough heat to react the contents of the reactor 18 to produce ammonia.

In other embodiments, the heating system controller 26 selectively applies heat from the active reservoir heating element 46 based on information associated with the temperature within the ammonium carbamate reservoir 20. The heating system controller 26 applies heat from the active reservoir heating element 46 when the temperature of the reservoir 20 is getting below a desired temperature as to maintain the equilibrium of the aqueous ammonium carbamate solution stored in the reservoir 20. If the passive reservoir heat exchanger 44 is not supplying enough heat to maintain the reservoir 20 at the desired temperature, the aqueous ammonium carbamate solution may form a precipitant or a solid. The heating system controller 26 applies heat from the active reservoir heating element 46 in an instance where the temperature is low enough the precipitant or the solid would form.

In another embodiment, the heating system controller 26 applies heat from the active doser heating element 56 to maintain the desired temperature within the dosing system 22. If the desired temperature is not maintained within the dosing system 22, then the percipient or the solid may form in the dosing system 22 causing blockage.

The heating system controller 26 also selectively modulates the heat from the passive reactor heat exchanger 34 to control the temperature within the ammonium carbamate reactor 18. The heating system controller 26 modulates the heat from the passive reactor heat exchanger 34 when the temperature within the reactor 18 rises above the desired temperature. The heating system controller 26 changes the valve 42 from the open position to the closed position to allow the exhaust to enter the bypass duct 40 and bypass the channel 38 which cools the contents of the reactor 18.

The heating system controller 26 also selectively modulates the heat from the passive reservoir heat exchanger 44 to control the temperature within the ammonium carbamate reservoir 20. The heating system controller 26 modulates the heat from the passive reservoir heat exchanger 44 when the temperature within the reservoir rises above the desired temperature. The heating system controller 26 changes the valve 50 from the open position to the closed position to block the exhaust from entering the passive reservoir heat exchanger channel 48. With the exhaust blocked from entering the passive reservoir heat exchanger channel 48, the contents of the reservoir 20 cools to the desired temperature. Lastly, the heating system controller 26 also modulates the heat from the passive doser heat exchanger 54 when the temperature within the dosing system rises above the desire temperature. The heating system controller 26 changes the valve 60 from the open position to the closed position to block the exhaust from entering the passive doser heat exchanger channel 58. With the exhaust blocked from entering the passive doser heat exchanger channel 58, the contents of the reservoir 20 cools to the desired temperature.

In the illustrative embodiment, the hybrid heating system 16 also includes a battery 64 as shown in FIG. 2. The battery 64 is coupled to the active reactor heating element 36 and provides a power source for the active reactor heating element 36. The battery 64 may also be coupled to the active reservoir heating element 46 and the active doser heating element 56 and provides the power source for the active reservoir heating element 46 and the active doser heating element 56. In some embodiments, the hybrid heating system 16 instead includes at least one of a solar panel or a wind turbine that provides the power source for the active heating elements 36, 46, 56.

In the illustrative embodiment, the automotive exhaust after treatment system 10 further includes a catalyst 70. The catalyst 70 is mounted within the system 10. The passive reactor heat exchanger 34 withdraws heat from the exhaust gases downstream of the catalyst 70 so as not to reduce exhaust gas temperatures before interaction with the catalyst 70.

Turning again to the catalytic NOx reduction unit 12 shown in FIG. 2, the catalytic NOx reduction unit 12 includes a dosing system 22, a mixer 68, a selective catalytic reduction system 70, and an ammonia slip catalyst system 72 as shown in FIG. 2. The dosing system 22 is coupled to an outer casing of the automotive exhaust aftertreatment system 10 and is configured to inject the engine exhaust flow with either diesel emission fluid or aqueous ammonium carbamate solution as suggested in FIG. 2. The mixer 68 is mounted within the system 10 and is configured to mix the engine exhaust with the fluid injected by the dosing system 22. The selective catalytic reduction system 70 is configured to selectively convert the exhaust-diesel emission fluid mixture comprising nitrogen oxides with the aid of the catalyst 70 into either nitrogen and water vapor or carbon dioxide. The reaction product is nitrogen and water vapor when diesel emission fluid is mixed with the exhaust and the reaction product is carbon dioxide when ammonia is mixed with the exhaust. The ammonia slip catalyst system 72 is configured to further convert any partially oxidized nitrogen oxides exiting the selective catalytic reduction system 70.

The catalytic NOx reduction unit 12 shown in FIG. 2 further includes a diesel emission fluid reservoir 24 and a diesel-doser pump 76 as shown in FIG. 2. The diesel emission fluid reservoir 24 is in communication with the ammonium carbamate reactor 18 and the dosing system 22. The diesel-doser pump 76 is coupled to the diesel emission fluid reservoir 24 and is configured to pump diesel emission fluid to the dosing system 22.

In the illustrative embodiment, the dosing system 22 includes a first doser 78 and a second doser 80 as shown in FIGS. 2 and 5. The first doser 78 is in communication with the ammonium carbamate reservoir 20 and is configured to discharge controlled amounts of aqueous ammonium carbamate solution into the exhaust stream moving through the exhaust gas aftertreatment system 10. The diesel-doser pump 76 is configured to pump diesel emission fluid to the first doser 78. The second doser 80 is in communication with the diesel emission fluid reservoir 24 and is configured discharge controlled amounts of aqueous ammonium carbamate solution into an exhaust stream moving through the exhaust gas aftertreatment system 10. In some embodiments, the dosing system 22 may only include one doser that is configured to selectively inject either diesel emission fluid or aqueous ammonium carbamate solution. If only one doser is included in the system 10, then a cleaning system may need to be implemented to ensure no remnants of the previous fluid are present in the doser before the other fluid is injected by the doser.

In the illustrative embodiment, the ammonium carbamate reactor 18 also includes a check valve 82 and a relief valve 84 as shown in FIGS. 2 and 3. The check valve is in communication with the ammonium carbamate reservoir 20 and is configured to allow the aqueous ammonium carbamate solution generated by the reactor 18 to exit the reactor 18, but prevent any fluid from re-entering the reactor 18. The relief valve 84 is in communication with the diesel emission fluid reservoir 24 and is configure to allow the removal of diesel emission fluid from the reactor 18 if the pressure within the ammonium carbamate reactor 18 exceeds a desired pressure.

The ammonia creation and conversion unit 14 further includes a ammonium-doser pump 86 and a diesel-reactor pump 88 as shown in FIG. 2. The ammonium-doser pump 86 is coupled to the ammonium carbamate reservoir 20 and is configured to pump aqueous ammonium carbamate solution to the second doser 80. The diesel-reactor pump 88 is coupled to the diesel emission fluid reservoir 24 and is configured to pump diesel emission fluid to the ammonium carbamate reactor 18. In some embodiments, only one pump may be included in the system 10 and in communication with the ammonium carbamate reactor 18, the ammonium carbamate reservoir 20, the diesel emission fluid reservoir 24, and the dosing system 22 to pump the desired contents to the desired location.

A possible method for reducing NOx emissions at low temperatures (cold start) or low load engine duty cycles @ temperatures <180 C is to add ammonium carbamate to an aftertreatment system. Current aftertreatment systems inject DEF which can be problematic at low temperature or low duty cycles. Current ASDS systems are gaseous NH3 delivery systems which will work in cold start or low load duty cycles but it does not use the current DEF infrastructure. It requires Ad-Ammine Cartridges.

State of the art ACCT (Ammonia Creation and Conversion Technology) contemplates uses existing DEF infrastructure. Such systems use a heating to heat the DEF to a steam/vapor and then cools the NH3 gas to create an Ammonium Carbamate liquid solution which works well at low temperature. However, some such systems are incapable of delivering ammonium carbamate full time during extended low load duty cycles.

A solution to constraints in currently proposed systems is to integrate a reactor capable of active heating in addition to passive heating. Active heating can be used for supplemental heat to maintain equilibrium in the tank. This means during extended periods of low load duty cycles when the passive heat is not sufficient to transform DEF to aqueous ammonium carbamate solution, then a portion of the heat exchanger is active either by battery operated means or clean energy means (solar or wind). This will maintain sufficient heat for DEF to be converted to aqueous ammonium carbamate. DEF conversion to aqueous ammonium carbamate solution starts at 100 C.

A method to control when the heating of DEF is also provided in this application. A control system is provided that determines when passive heating alone can work, passive heating in combination with active heating, or active heating alone. The need to maintain sufficient ammonium carbamate solution in the tank is desired in many implementations to remove NOx during cold start and extended low load/low duty cycles. A control algorithm will use exhaust flow, exhaust temperature, and/or Ammonium Carbamate tank level—among other things—to determine when to switch on and off the active heat.

According to the present disclosure, an aftertreatment may be setup with a DEF tank, Passive and Active Reactors integrated (will be described as a heat exchanger), pump, valves, controller, and an Ammonium Carbamate tank. The need for such a system is to have a an exhaust aftertreatment system that meets the Ultra Low NOx emissions of 0.02 g hp-hr proposed for 2023 by CARB (California Air Resources Board). This disclosure in particular is to use the heat exchanger using exhaust heat downstream of the aftertreatment system so not to remove needed heat upstream or at the aftertreatment system. A pump delivers the DEF from the tank to the heat exchanger, thus heating up the DEF to a point (>250 C) where it transform to NH3 gas through thermolysis and hydrolysis. The Ammonium Carbamate gas is then metered to the DEF injector through a valve and control system that determines when threshold temperature is below 180 C. During extended times of diesel engine low load duty cycles, for example during extended idle or operating in stop an go traffic, the active heat exchanger will keep the ammonium carbamate tank in equilibrium and the aftertreatment control system can switch between passive and active. Active heating will take energy from a vehicle battery—which can range between 2 to 5 kw. The injector will inject the proper amount of NH3 gas depending on the amount of NOx to be reduced, this will be controlled via monitoring temperature, dosing, and ammonium carbamate level, NOx sensors and a controller.

Embodiments of the present disclosure contemplate the use of active heating integrated with passive heating to keep ammonium carbamate tank level in equilibrium. This will ensure there is sufficient volume of ammonium carbamate quantity to reduce NOx during cold start and low load duty cycles to meet Ultra Low NOx requirements.

The following numbered clauses include embodiments that are contemplated and non-limiting:

Clause 1: An automotive exhaust aftertreatment system, the system comprising a diesel emission fluid reservoir, an ammonium carbamate reactor coupled to the diesel emission fluid reservoir and configured to generate aqueous ammonium carbamate solution from diesel emission fluid, an ammonium carbamate reservoir for storing generated aqueous ammonium carbamate solution coupled to the ammonium carbamate reactor, and a hybrid heating system configured to manage temperatures within the ammonium carbamate reactor, the hybrid heating system including a passive reactor heat exchanger configured to withdraw heat from exhaust gasses passing through the exhaust aftertreatment system and heat contents of the ammonium carbamate reactor, an active reactor heating element configured to produce heat from electrical energy supplied to the heating system and heat contents of the ammonium carbamate reactor, and a heating system controller configured to selectively apply heat from the active reactor heating element to manage the temperature within the ammonium carbamate reactor.

Clause 2: The system of any other suitable clause or combination of clauses, further comprising a catalyst mounted within the system. The passive reactor heat exchanger configured to withdraw heat from exhaust gasses downstream of the catalyst so as not to reduce exhaust gas temperatures before interaction with the catalyst.

Clause 3: The system of any other suitable clause or combination of clauses, wherein the heating system controller is configured to selectively modulate heat from the passive reactor heat exchanger to control the temperature within the ammonium carbamate reactor.

Clause 4: The system of any other suitable clause or combination of clauses, wherein the hybrid heating system includes a battery that provides a power source for the active reactor heating element.

Clause 5: The system of any other suitable clause or combination of clauses, wherein the hybrid heating system includes at least one of a solar panel and a wind turbine that provides a power source for the active reactor heating element.

Clause 6: The system of any other suitable clause or combination of clauses, wherein the heating system includes a battery, a solar panel, and/or a wind turbine that provides a power source for the active reactor heating element.

Clause 7: The system of any other suitable clause or combination of clauses, wherein the heating system controller selectively applies heat from the active reactor heating element based on information associated with exhaust gas flow rate and exhaust gas temperature received from sensors.

Clause 8: The system of any other suitable clause or combination of clauses, wherein the heating system controller selectively applies heat from the active reactor heating element based on information associated with tank level within the ammonium carbamate reservoir received from sensors.

Clause 9: The system of any other suitable clause or combination of clauses, wherein the hybrid heating system includes an active reservoir heating element configured to produce heat from electrical energy supplied to the heating system and heat contents of the ammonium carbamate reservoir, and/or wherein the heating system controller configured to selectively apply heat from the active reactor heating element to manage the temperature within the ammonium carbamate reservoir to maintain equilibrium of stored aqueous ammonium carbamate solution.

Clause 10: The system of any other suitable clause or combination of clauses, wherein the hybrid heating system includes a passive reservoir heat exchanger configured to withdraw heat from exhaust gasses passing through the exhaust aftertreatment system and heat contents of the ammonium carbamate reservoir, and/or wherein the heating system controller is configured to selectively modulate heat from the passive reservoir heat exchanger to control the temperature within the ammonium carbamate reservoir to maintain equilibrium of stored aqueous ammonium carbamate solution.

Clause 11: The system of any other suitable clause or combination of clauses, further comprising a catalyst mounted within the system, and/or wherein the passive reservoir heat exchanger withdraws heat from exhaust gasses downstream of the catalyst so as not to reduce exhaust gas temperatures before interaction with the catalyst.

Clause 12: An automotive exhaust aftertreatment system, the system comprising
 a diesel emission fluid reservoir,
 an ammonium carbamate reactor coupled to the diesel emission fluid reservoir and configured to generate aqueous ammonium carbamate solution from diesel emission fluid,
 an ammonium carbamate reservoir for storing generated aqueous ammonium carbamate solution coupled to the ammonium carbamate reactor, and
 a hybrid heating system configured to manage temperatures within the ammonium carbamate reservoir, the hybrid heating system including (i) an active reservoir heating element configured to produce heat from electrical energy supplied to the heating system thereby heating contents of the ammonium carbamate reservoir and (ii) a passive reservoir heat exchanger configured to withdraw heat from exhaust gasses passing through the exhaust aftertreatment system to thereby heat contents of the ammonium carbamate reservoir, and (iii) a heating system controller configured to selectively apply heat from the active reservoir heating element and configured to selectively modulate heat from the passive reservoir heat exchanger to manage the temperature within the ammonium carbamate reservoir.

Clause 13: The system of any other suitable clause or combination of clauses, further comprising a catalyst mounted within the system, and/or wherein the passive reservoir heat exchanger withdraws heat from exhaust gasses downstream of the catalyst so as not to reduce exhaust gas temperatures before interaction with the catalyst.

Clause 14: A vehicle comprising
 a combustion engine configured to generate exhaust gases, and
 an exhaust aftertreatment system configured to treat the exhaust gases, the system including
  a diesel emission fluid reservoir,
  an ammonium carbamate reactor coupled to the diesel emission fluid reservoir and configured to generate aqueous ammonium carbamate solution from diesel emission fluid,
  an ammonium carbamate reservoir for storing generated aqueous ammonium carbamate solution coupled to the ammonium carbamate reactor, and
  a hybrid heating system configured to manage temperatures within the ammonium carbamate reactor, the hybrid heating system including a passive reactor heat exchanger configured to withdraw heat from exhaust gasses passing through the exhaust aftertreatment system and heat contents of the ammonium carbamate reactor, an active reactor heating element configured to produce heat from electrical energy supplied to the heating system and heat contents of the ammonium carbamate reactor, and a heating system controller configured to selectively apply heat from the active reactor heating element to manage the temperature within the ammonium carbamate reactor.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:
1. An automotive exhaust aftertreatment system, the system comprising
 a diesel emission fluid reservoir, an ammonium carbamate reactor coupled to the diesel emission fluid reservoir and configured to generate aqueous ammonium carbamate solution from diesel emission fluid, an ammonium carbamate reservoir for storing generated aqueous ammonium carbamate solution coupled to the ammonium carbamate reactor, and a heating system configured to manage temperatures within the ammonium carbamate reactor, the heating system including a passive reactor heat exchanger configured to withdraw heat from exhaust gasses passing through the exhaust aftertreatment system and heat contents of the ammonium carbamate reactor, an active reactor heating element configured to produce heat from electrical energy supplied to the heating system and heat contents of the ammonium carbamate reactor, and a heating system controller configured to selectively apply heat from the active reactor heating element to manage the temperature within the ammonium carbamate reactor.

2. The system of claim 1, further comprising a catalyst mounted within the system, and wherein the passive reactor heat exchanger withdraws heat from exhaust gasses downstream of the catalyst so as not to reduce exhaust gas temperatures before interaction with the catalyst.

3. The system of claim 2, wherein the heating system controller is configured to selectively modulate heat from the passive reactor heat exchanger to control the temperature within the ammonium carbamate reactor.

4. The system of claim 1, wherein the heating system includes a battery that provides a power source for the active reactor heating element.

5. The system of claim 1, wherein the heating system includes at least one of a solar panel and a wind turbine that provides a power source for the active reactor heating element.

6. The system of claim 1, wherein the heating system includes a battery, a solar panel, and/or a wind turbine that provides a power source for the active reactor heating element.

7. The system of claim 1, wherein the heating system controller selectively applies heat from the active reactor heating element based on information associated with exhaust gas flow rate and exhaust gas temperature received from sensors.

8. The system of claim 7, wherein the heating system controller selectively applies heat from the active reactor heating element based on information associated with tank level within the ammonium carbamate reservoir received from sensors.

9. The system of claim 1, wherein the heating system includes an active reservoir heating element configured to produce heat from electrical energy supplied to the heating system and heat contents of the ammonium carbamate reservoir, and wherein the heating system controller configured to selectively apply heat from the active reactor heating element to manage the temperature within the ammonium carbamate reservoir to maintain equilibrium of stored aqueous ammonium carbamate solution.

10. The system of claim 9, wherein the heating system includes a passive reservoir heat exchanger configured to withdraw heat from exhaust gasses passing through the exhaust aftertreatment system and heat contents of the ammonium carbamate reservoir, and wherein the heating system controller is configured to selectively modulate heat from the passive reservoir heat exchanger to control the temperature within the ammonium carbamate reservoir to maintain equilibrium of stored aqueous ammonium carbamate solution.

11. The system of claim 10, further comprising a catalyst mounted within the system, and wherein the passive reservoir heat exchanger withdraws heat from exhaust gasses downstream of the catalyst so as not to reduce exhaust gas temperatures before interaction with the catalyst.

12. An automotive exhaust aftertreatment system, the system comprising
a diesel emission fluid reservoir,
an ammonium carbamate reactor coupled to the diesel emission fluid reservoir and configured to generate aqueous ammonium carbamate solution from diesel emission fluid,
an ammonium carbamate reservoir for storing generated aqueous ammonium carbamate solution coupled to the ammonium carbamate reactor, and
a heating system configured to manage temperatures within the ammonium carbamate reservoir, the heating system including (i) an active reservoir heating element configured to produce heat from electrical energy supplied to the heating system thereby heating contents of the ammonium carbamate reservoir and (ii) a passive reservoir heat exchanger configured to withdraw heat from exhaust gasses passing through the exhaust aftertreatment system to thereby heat contents of the ammonium carbamate reservoir, and (iii) a heating system controller configured to selectively apply heat from the active reservoir heating element and configured to selectively modulate heat from the passive reservoir heat exchanger to manage the temperature within the ammonium carbamate reservoir.

13. The system of claim 12, further comprising a catalyst mounted within the system, and wherein the passive reservoir heat exchanger withdraws heat from exhaust gasses downstream of the catalyst so as not to reduce exhaust gas temperatures before interaction with the catalyst.

14. A vehicle comprising
a combustion engine configured to generate exhaust gases, and
an exhaust aftertreatment system configured to treat the exhaust gases, the system including
a diesel emission fluid reservoir,
an ammonium carbamate reactor coupled to the diesel emission fluid reservoir and configured to generate aqueous ammonium carbamate solution from diesel emission fluid,
an ammonium carbamate reservoir for storing generated aqueous ammonium carbamate solution coupled to the ammonium carbamate reactor, and
a hybrid heating system configured to manage temperatures within the ammonium carbamate reactor, the hybrid heating system including a passive reactor heat exchanger configured to withdraw heat from exhaust gasses passing through the exhaust aftertreatment system and heat contents of the ammonium carbamate reactor, an active reactor heating element configured to produce heat from electrical energy supplied to the heating system and heat contents of the ammonium carbamate reactor, and a heating system controller configured to selectively apply heat from the active reactor heating element to manage the temperature within the ammonium carbamate reactor.

* * * * *